(12) United States Patent
Warden

(10) Patent No.: US 6,661,767 B2
(45) Date of Patent: Dec. 9, 2003

(54) TONE ARM ASSEMBLY WITH INTERCHANGEABLE TONE ARM TUBE

(75) Inventor: Robert A. Warden, Providence, RI (US)

(73) Assignee: Numark Industries, LLC, Cumberland, RI (US)

( * ) Notice: Subject to any disclaimer, the term of this patent is extended or adjusted under 35 U.S.C. 154(b) by 0 days.

(21) Appl. No.: 10/248,705

(22) Filed: Feb. 11, 2003

(65) Prior Publication Data

US 2003/0156527 A1 Aug. 21, 2003

Related U.S. Application Data

(60) Provisional application No. 60/357,450, filed on Feb. 15, 2002.

(51) Int. Cl.[7] .................................................. G11B 3/10

(52) U.S. Cl. ..................................................... 369/244

(58) Field of Search ................................. 369/172, 244, 369/256

(56) References Cited

U.S. PATENT DOCUMENTS

| 4,257,615 A | * | 3/1981 | Morch | 369/244 |
| 4,340,957 A | * | 7/1982 | Kuehn | 369/256 |

* cited by examiner

Primary Examiner—George J. Letscher
(74) Attorney, Agent, or Firm—Barlow, Josephs & Holmes, Ltd.

(57) ABSTRACT

A tone arm assembly with an interchangeable tone arm tubes includes a fixed base. A support bracket is connected to the fixed base and rotatable thereon. A tone arm housing is mounted in the support bracket and rotatable therein. A separate straight tone arm tube and an S-shaped tone arm tube both have a connector at one end that is engageable with a connector on the tone arm base. The other ends of the tone arm tubes have another connector for removably attaching a cartridge thereto. The straight tone arm tube and the S-shaped tone arm tube are interchangeably connected to the tone arm housing via the respective connectors. Depending on the desired performance, on the same tone arm base, either the straight tone arm tube can be used for improved anti-skip performance or the S-shaped tone arm tube may be used for improved sound quality.

13 Claims, 7 Drawing Sheets

TONE ARM ASSEMBLY WITH INTERCHANGEABLE TONE ARM TUBE

CROSS REFERENCE TO RELATED APPLICATIONS

This application is related to and claims priority from earlier filed provisional patent application Ser. No. 60/357,450, filed Feb. 15, 2002.

BACKGROUND OF INVENTION

The invention relates generally to an improved tone arm assembly for record players. The present invention particularly relates to providing both high fidelity sound performance with anti-skip performance from the same tone arm assembly.

It is well known in the art that to reproduce the information recorded on a record, a tone arm is conventionally pivotally mounted at a fixed location upon a chassis adjacent the side of a rotatably mounted turntable. The weight of the tone arm wedges the stylus of a reproducing pick-up assembly into the groove, with the electrical output of the reproducing pick-up being proportional to the lateral displacement of the stylus by the lateral vibration of the groove sides. In a such a record player, grooves of the record carry lateral vibrations that move the stylus of a cartridge connected to a tone arm assembly back and forth at right angles to the groove. The groove is a very slight spiral, and thus almost a perfect circle, with its center corresponding with the center of the disc. Thus, the stylus moves back and forth along a radius from the record's center. With such a conventional arrangement, it can be seen that the stylus moves through an arcuate path and thus the vibrations of the stylus are not maintained at right angles to the groove as they should be.

There are a number of problems typically associated with record players. Most notably, conventional tone arms are prone to skating across the record. As a result of the forces exerted on the stylus of such a conventional tone arm during playing of a record, since there is an angle between the line tangent to the groove and the line between the stylus point and the pivot point of the tone arm, there is a component of force directed radially inwardly of the record which tends to pull the stylus towards the center of the record. This radially directed force may cause the stylus to jump over one or more convolutions of the spiral groove in a skating or skipping action.

The danger of a tone arm skating across a record is greatly exacerbated during "scratching" of the record where the turntable is rotated back and forth successively with the stylus still in communication with the grooves of the record. As can be understood, such movement increases the directional forces on the grooves of the record thus increasing the likelihood of skipping or skating.

To address such skipping and skating problems which are encountered frequently when scratching, it has been found that the employment of tone arm assembly with a straight tone arm tube reduces the likelihood that the stylus will skip or skate out the grooves during scratching. In general, the path of a straight tone arm reduces the directional forces during scratching. The details of why the path and the configuration of a straight tone arm assembly reduces the skipping and skating during scratching is well known in the art and need not be discussed herein.

In addition, the radial forces, created by the conventional tone arm during playing of a record, not only make the record prone to skipping but also reduce the overall sound quality of playback. More specifically, if there is any deviation from the radial vibration of the stylus, a tracking error will result. Such tracking error creates distortion and unpleasant noise in the reproduced sound, as well as increased record wear. Even the slightest tracking error will have an effect of the overall quality of the sound.

To address the foregoing problems with directional forces of the stylus in the grooves as they relate to sound quality, many attempts have been made in the prior art to reduce the directional forces for the specific purpose of improving the quality of playback sound. It has been found, as is well known in the art, that the employment of a tone arm assembly with an S-shaped tone arm tube improves the fidelity of the sound played back from the record by improving the signal to noise ratio. In general, the path of an S-shaped tone arm reduces the directional forces during playback for better tracking an high quality playback. The details of why the path and the configuration of an S-shaped tone arm assembly reduces the skipping and skating during scratching is well known in the art and need not be discussed herein.

In view of the foregoing, turntables are typically manufactured with a tone arm assembly that is optimized either for anti-skating/anti-skipping or for high fidelity. For anti-skipping, the tone arm assembly is equipped with a straight tone arm tube. Alternatively, the tone arm assembly is equipped with an S-shaped tone arm tube for achieving higher fidelity play over the tone arm assembly with the straight tone arm. Once the tone arm assembly is selected it is permanently installed onto a turntable for use.

Known record turntables are specifically configured, by design of the tone arm assembly, to be optimized either for anti-skipping or for high fidelity but not both. Since, users of turntables, such as a disc jockeys, play records with and without scratching, two complete turntables are typically used. One of the turntables has a tone arm assembly with a straight tone arm tube with the other turntable has a tone arm assembly with an S-shaped tone arm tube. When a disc jockey performs at a given venue, the two turntables must be both brought to accommodate both types of performance, that is, high fidelity playback and scratching.

As can be understood, the use of two separate turntables is not only cumbersome for transport but is also expensive in that two separate turntables are required to accommodate the two different types of playback style.

In view of the foregoing, there is a demand for a tone arm assembly that can accommodate high fidelity playback of records as well as a scratching performance without skipping or skating. There is a particular demand for a single tone arm assembly on a single turntable that can accommodate high fidelity playback of records as well as a scratching performance. Moreover, there is a demand for a tone arm assembly that can accommodate both a straight tone arm tube and an S-shape tone arm tube. There is a demand for a tone arm assembly that can be easily converted from a straight tone arm tube configuration to an S-shaped tone arm tube and back. Also, there is a demand for a tone arm assembly that is modular in construction.

SUMMARY OF INVENTION

The present invention preserves the advantages of prior art turntables and tone arm assemblies. In addition, it provides new advantages not found in currently available turntables and tone arm assemblies and overcomes many disadvantages of such currently available apparatuses.

The invention is generally directed to the novel and unique tone arm assembly and method of converting such an assembly. The assembly has particular use in the disc jockey music industry in that the turntable can be easily converted over from a turntable with an S-shaped tone arm tube with high quality sound to a turntable with a straight tone arm tube for better anti-skip performance.

The tone arm assembly of the present invention enables the easiest and most cost-efficient way of providing both high fidelity sound and best anti-skip performance in a single tone arm assembly. The present invention addresses the foregoing problems associated with the prior art while providing superior performance and reliability.

The tone arm assembly of the present invention includes a includes a fixed base. A support bracket is connected to the fixed base and rotatable thereon. A tone arm housing is mounted in the support bracket and rotatable therein. A separate straight tone arm tube and an S-shaped tone arm tube both have a connector at one end that is engageable with a connector on the tone arm base. The other ends of the tone arm tubes have another connector for removably attaching a cartridge thereto. The straight tone arm tube and the S-shaped tone arm tube are interchangeably connected to the tone arm housing via the respective connectors.

For example, for better anti-skip performance during play, such as during scratching, it may be preferred to connect the straight tone arm tube to the tone arm base. In the event high fidelity with high signal to noise ratio sound is desired, the straight tone arm tube is disconnected from the tone arm base. The S-shaped tone arm tube is then connected to the tone arm base using a connector which is identical to the connector used to connect the straight tone arm tube to the tone arm base. When better anti-skip performance is desired, the S-shaped tone arm is then disconnected and the straight tone arm is then re-connected. As a result, the straight tone arm tube and the S-shaped tone arm tube can be easily interchanged on the same tone arm base depending on the desired performance.

It is therefore an object of the present invention to provide a single tone arm assembly that can provide both high fidelity sound and anti-skip performance.

It is an object of the present invention to provide a tone arm assembly that can accommodate both a straight tone arm tube and an S-shaped tone arm tube.

It is a further object of the present invention to provide a tone arm assembly that can easily switch between a straight tone arm tube and an S-shaped tone arm tube without special tools.

Another object of the present invention is to provide a tone arm assembly that is modular in construction to easily accommodate different type of tone arm tubes.

It is a further object of the present invention to provide a tone arm assembly that obviates the need to use two different turntables to provide both high fidelity sound and anti-skip performance.

BRIEF DESCRIPTION OF DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION

Figure 1:
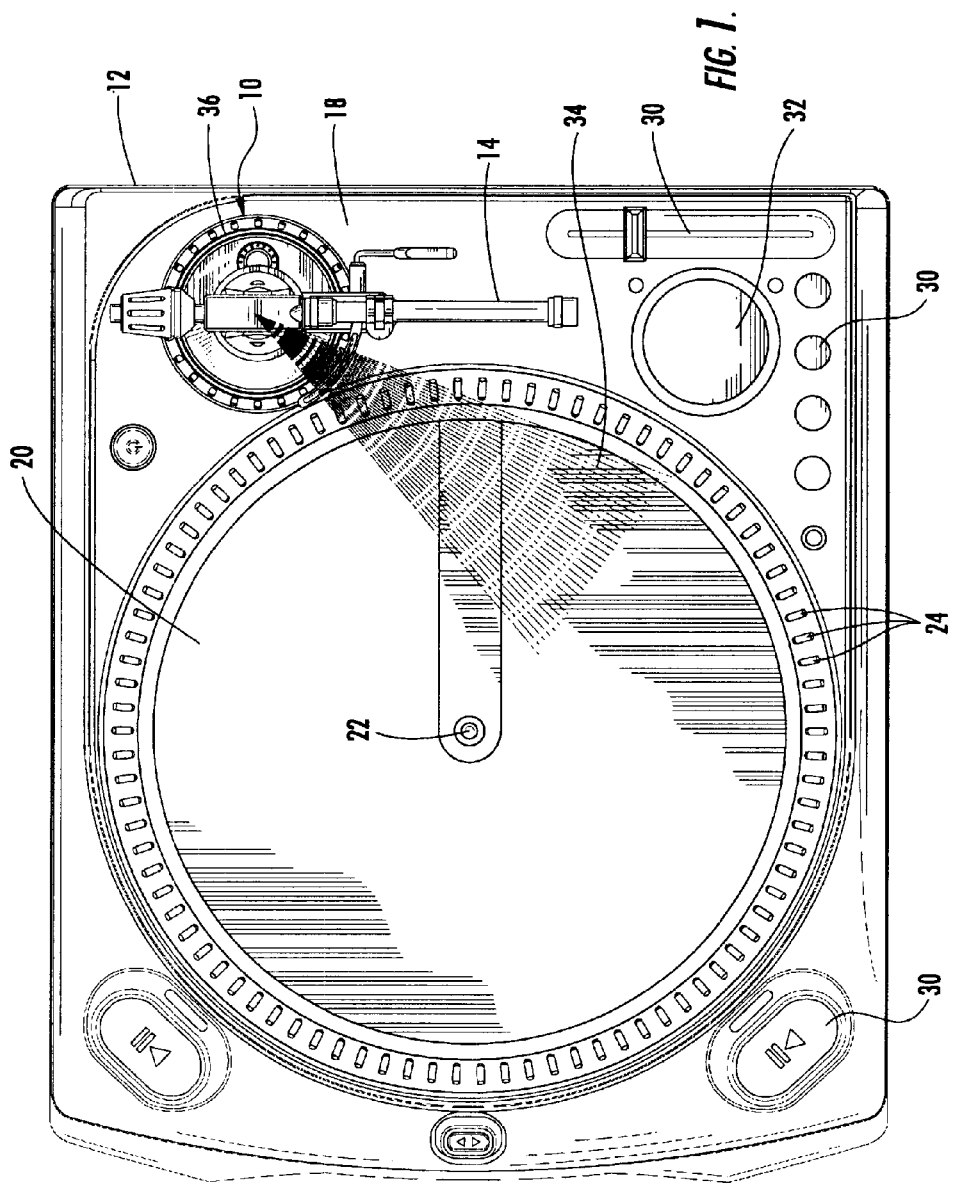
FIG. 1 is a top view of a turntable with the tone arm assembly of the present invention employing a straight tone arm tube.
Figure 2:
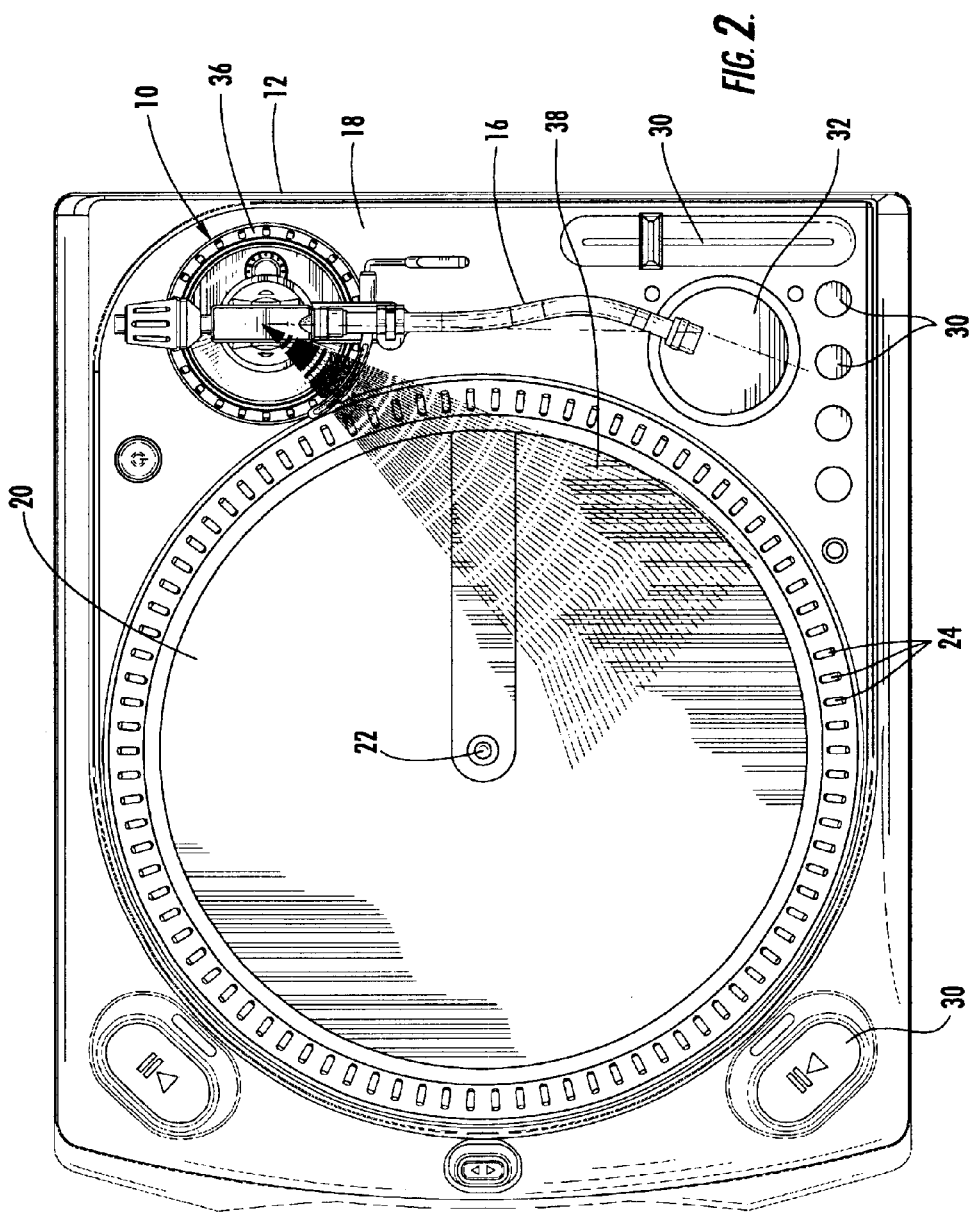
FIG. 2 is a top view of the turntable with the tone arm assembly of the present invention employing an S-shaped tone arm tube.

Turning first to FIGS. 1 and 2, top views of a turntable 12 employing the tone arm assembly 10 of the present invention is shown. FIG. 1 shows the tone arm assembly 10 configured with a straight tone arm tube 14 while FIG. 2 shows the tone arm assembly configuration 10 with an S-shaped tone arm tube 16.

The tone arm assembly 10 of the present invention may be installed on many different types of turntables 12. The turntable 12 of FIGS. 1 and 2 is shown by way of example to illustrate a typical environment for the tone arm assembly 10 of the present invention. The turntable 10 includes a turntable base 18 with a rotating platter 20 and a center spindle 22. The platter 20 is preferably made of die-cast aluminum. The usual strobe pattern 24 is provided on the edge of the platter for precise speed adjustment. The tone arm assembly 10 is placed in a location proximal to the platter 20 that optimizes both playback with a straight tone arm 14 and with an S-shaped tone arm 16. This location enables the cartridge 26 and stylus 28 (shown in FIG. 7) to be positioned as parallel as possible within the grooves of a record (not shown) when either one of the tubes 14 or 16 are employed. The platter 20 is preferably powered by a direct drive high torque motor (not shown) for reliability and precision.

A number of controls 30 are provided for normal operation of the turntable, such as a play/pause, RPM, motor and pitch fader controls. A display 32 may also be provided to visually indicate the operation of the turntable 12, such as speed or volume. As can be understood the type and layout of the controls 30 can be modified to suit the particular needs of the turntable.

Most importantly, the turntable 12 construction includes a tone arm assembly 10.

As seen in FIG. 1, the tone arm assembly 10 is shown equipped with a straight tone arm 14 which provides a sweep path 34. It is generally known in the prior art and preferred in the industry that a typical straight arm sweep path 34 of the free end of the tone arm tube 14 pass inside between the center spindle 22 and the fixed base 36 of the tone arm assembly 10. This illustrated sweep path 34, characteristic of a tone arm assembly 10 with a straight tone arm 14, provides for improved anti-skip and anti-skate performance.

FIG. 2 illustrates the same tone arm assembly 10 equipped with an S-shaped tone arm 16 which provides a sweep path 38. It is generally known in the prior art and preferred in the industry that the free end of the S-shaped tone arm tube 16 pass outside of the center spindle 22. This illustrated sweep path 38, characteristic of a tone arm assembly 10 with an S-shaped tone arm 16, provides for improved sound quality with a higher signal to noise ration over turntables 12 with a tone arm assembly 10 equipped with a straight tone arm tube 14.

As will be described in detail below, the present invention enables the same turntable 12 and tone arm assembly 10 to be used to provide both the sweep path 34 of FIG. 1 for a straight tone arm tube 14 as well as a the sweep path 38 of FIG. 2 for an S-shaped tone arm tube 16. In the prior art, tone arm assemblies are permanently configured to have either a straight tone arm tube or an S-shaped tone arm tube. In the prior art, the tone arm assembly is permanently mounted to the turntable body for the purposes of providing either the sweep path 34 of FIG. 1 or the sweep path 38 of FIG. 2.

Turning now to FIGS. 3–7, details of the construction of the tone arm assembly 10 of the present invention is shown. The unique modular construction of the tone arm assembly 10 of the present invention enables either a straight tone arm tube 14 or an S-shaped tone arm tube 16 to be used on the same tone arm base 36.

Figure 3:
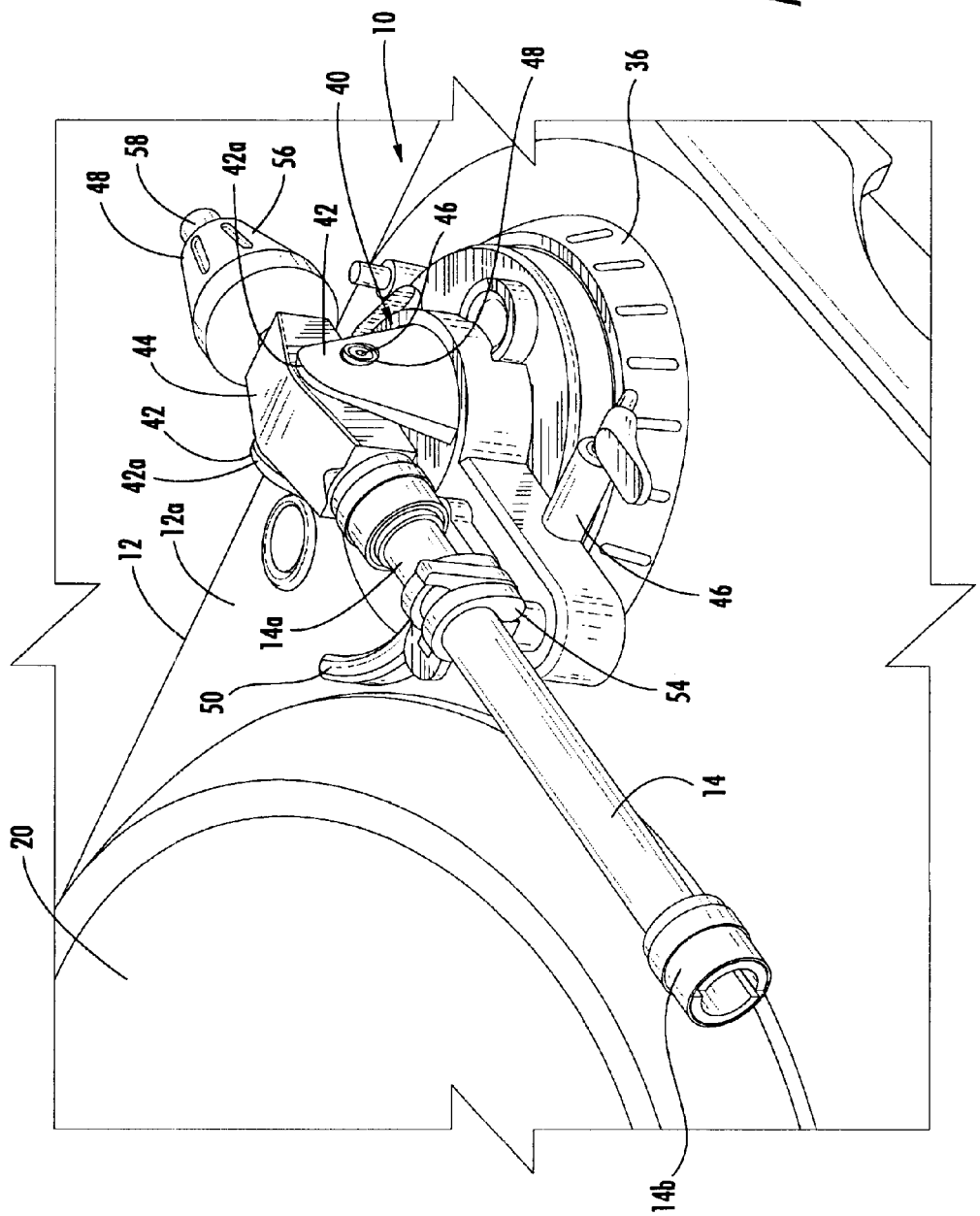
FIG. 3 is a close-up perspective view of the tone arm assembly of the present invention shown in FIG. 1.

Turning specifically to FIG. 3, a tone arm base 36, with a longitudinal axis, is securely fixed to the top surface 12a of the turntable 12 in a position proximal to the platter 20. A support bracket 40 is affixed to the tone arm base 36 and is capable of rotating about the longitudinal axis of the tone arm base 36. The bracket 40 includes a pair of upstanding walls 42 for pivotally receiving a tone arm housing 44 therein. A pin 46, for example, is routed through apertures 48 proximal to the top edges 42a of the upstanding walls 42. As a result, the tone arm housing 44 pivots up and down about the pin 46. It is possible to use protrusions (not shown) extending outwardly from the sides of the tone arm housing 44 instead of pin 46 completely therethrough. It should be understood that the configuration of the tone arm base 36 and tone arm housing 44 is merely an example of different constructions that can be used. Other configurations can be employed and still be within the scope of the present invention. Whatever structure is used, the tone arm housing 44 is pivotally mounted relative to the support bracket 42 and the support bracket is rotatable relative to tone arm base 36.

Figure 4:
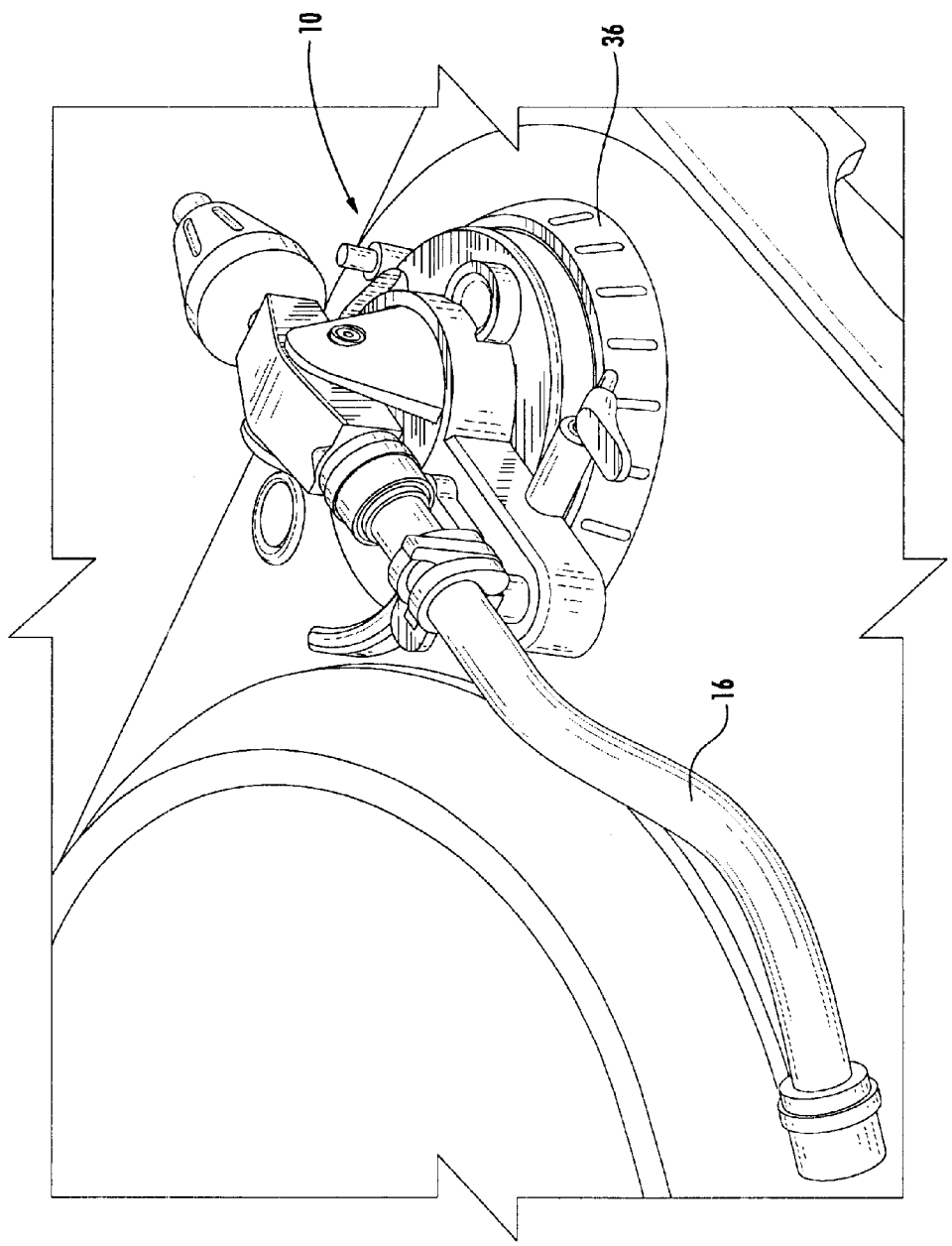
FIG. 4 is a close-up perspective view of the tone arm assembly of the present invention shown in FIG. 2.

The tone arm assembly 10 of FIG. 3 includes a straight tone arm tube 14 which is connected to the tone arm housing 44 which is pivotally connected to the support bracket 42. FIG. 4 shows the an S-shaped tone arm tube 16 which is connected to the tone arm housing 44 which is pivotally connected to the support bracket 42. In prior art tone arm assemblies, the tone arm tube is permanently mounted to the tone arm housing. However, in accordance with the present invention, the tone arm tube, either straight, S-shaped or otherwise, is removably connected to the tone arm housing 44.

The tone arm assembly 10, which is shown in FIGS. 3 and 4, also includes an integrated cueing system 46 with a cantilever height adjustment 48 with track 50 for elevating the tone arm tube 14, 16 and cartridge 26 (shown in FIG. 7) above the record surface as well as for gently lowering the cartridge 26 onto the record surface in the desired position for playback. This height adjustment allows for a variety of set-ups for a head shell and cartridge 26 to be utilized with only minor adjustments. A latch 54 is also provided for securing the tone arm tube 14, 16 when the player is not in use. Also, an anti-skate counterweight 56 is provided on the opposite end of the tone arm housing 44 to where the tone arm tube 14, 16 is connected. The counterweight 56 is threadably mounted on a post 58 and is adjusted in and out to change the pivot action of the tone arm housing 44 and the resultant pressure placed on the stylus 28 during playback for anti-skate adjustment. The cueing system 46 with height adjustment, latch 54 and anti-skate components are so well known in the art that further details of their construction and operation need not be discussed herein.

Figure 5:
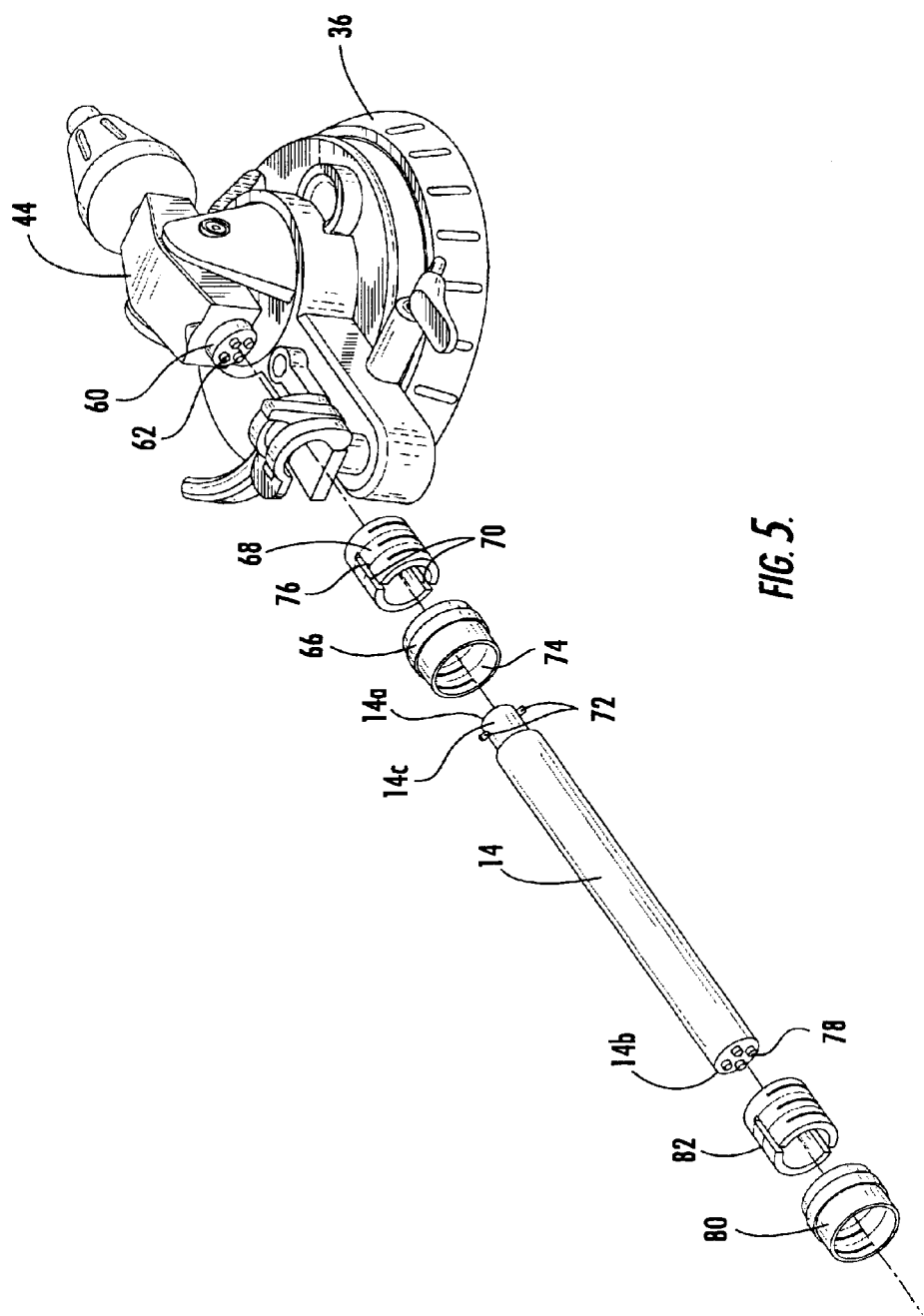
FIG. 5 is an exploded front perspective view of the tone arm assembly of FIG. 3.
Figure 7:
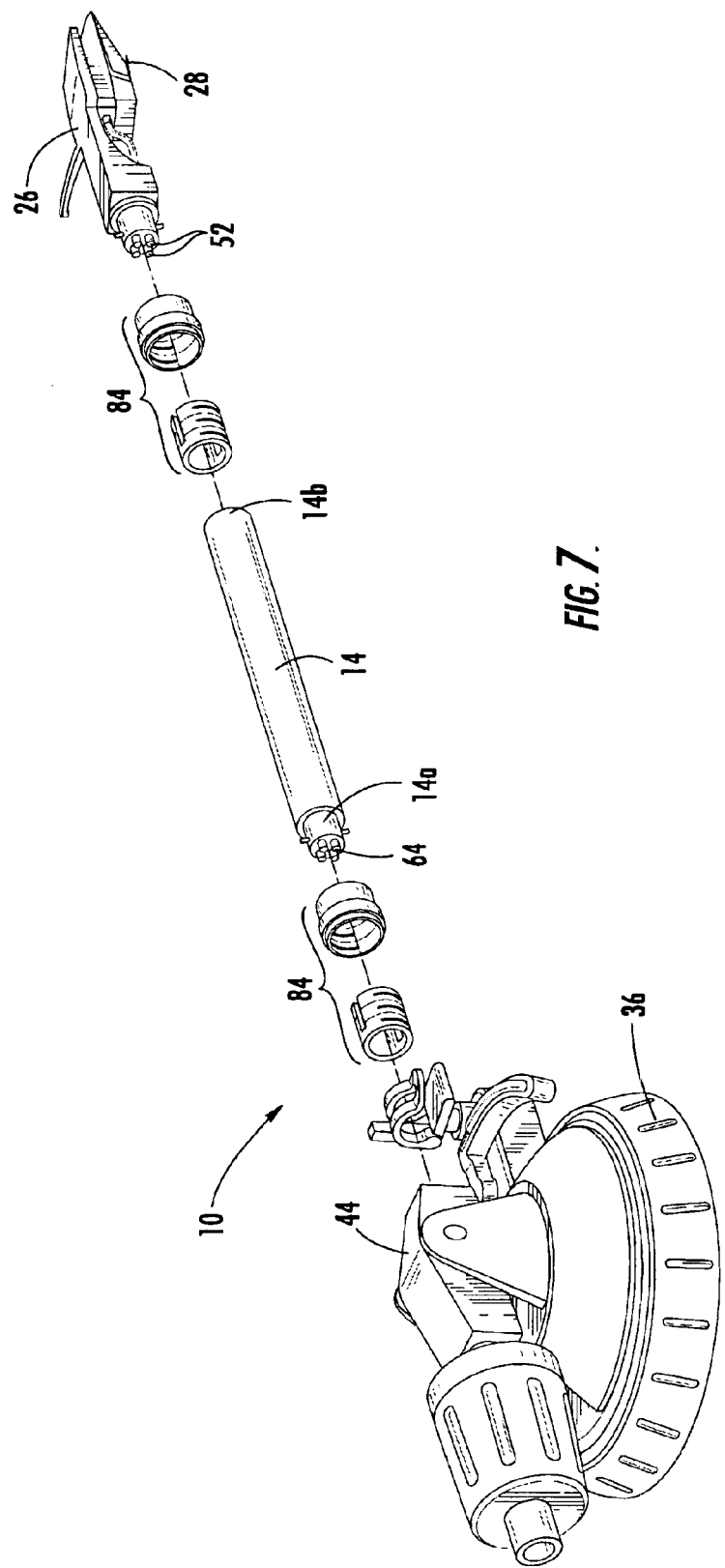
FIG. 7 is an exploded rear perspective view of the tone arm assembly of FIG. 3.

FIG. 5 is an exploded front perspective view of the tone arm assembly 10 of the present invention showing the removable interconnection of the tone arm tube 14 to the tone arm base 36. More specifically, the tone arm tube 14 includes a first end 14a and a second end 14b. The first end 14a interconnects and electronically interfaces with the tone arm housing 44. A boss 60 is provided on one side of the tone arm housing 44 with, preferably, a array of four electrical contacts 62. One pair of the contacts 62 corresponds to the left stereophonic channel while the other pair corresponds to the right stereophonic channel. As shown in FIG. 7, a corresponding array of four electrical contacts 64 are present on the first end 14a of the tone arm tube 14 for electrical communication with the contacts 62 on the tone arm housing 44.

To maintain the first end 14a of the tone arm tube 14 in electrical communication with the tone arm housing 44 via their respective contacts 64, 62, a keyed locking collar arrangement is preferably used. A tube 68 with a pair of slots 70 is affixed about the boss 60. A pair of protrusions 72, which emanate outwardly from a reduced neck portion 14c of the first end 14a of the tone arm tube 14 are received in slots 70 in the tube 68. A threaded collar 66, with female threads 74, resides over the outer circumference of the tone arm tube 14. The female threads 74 engage with the male threads 76 on the exterior surface of the tube 68 with is affixed about the boss 60. As a result, as the collar 66 is threaded onto the tube 68, the first end 14a of the tone arm tube 14, namely, the array of four contacts 64 are drawn into electrical communication with a similarly arranged array of four electrical contacts 62 on the tone arm housing 44. Thus, the tone arm tube 14 is not only electrically connected to the tone arm housing 44 but also structurally secured thereto. The interior of the tone arm tube 14, while not shown, includes the typical electrical wires spanning from the first end 14a to the second end 14b as found in prior art tone arm tubes. As a result, a continuous electrical interconnection is maintained from the cartridge 26 to the electronics of the turntable 12.

Thus, the tone arm tube 14 can be structurally and electrically disconnected from the tone arm housing 44 without special tools. In contrast, prior art tone arm tubes are permanently electrically and structurally connected to the tone arm housing 44.

While the foregoing interconnection structure is preferred, other interconnection configurations may be employed and still be within the scope of the present invention. For example, instead of a locking collar 66, a snap lock connection may be used.

Still referring to FIG. 5, the second end 14b of the tone arm tube 14 is also provided with an array of electrical contacts 78 which are preferably identical to the array of contacts 62 found on the boss 60 of the tone arm housing 44. As show in FIG. 7, a phonograph cartridge 26 is structurally and electrically interconnected to the second end 14b of the tone arm tube 14. The cartridge 26 also includes an array of electrical contacts 52 for electrically interconnecting to the array of contacts 78 on the second end 14b of the tone arm tube 14. A second locking collar 80 and slotted tube 82, of the same type used to the connect the first end 14a of the tone arm tube 14 to the tone arm housing 44, is preferably used to connect the second end 14b of the tone arm tube 14 to the cartridge 26. Details of this interconnection need not be further addressed herein as the operation of this second locking collar arrangement is identical to the operation of the first locking collar arrangement to connect the first end 14a of the tube 14 to the tone arm housing 44. As a result, a continuous electrical path is provided from the cartridge 26, through the tone arm tube 14, through the tone arm housing 44 and into the electronics of the turntable 12.

Figure 6:
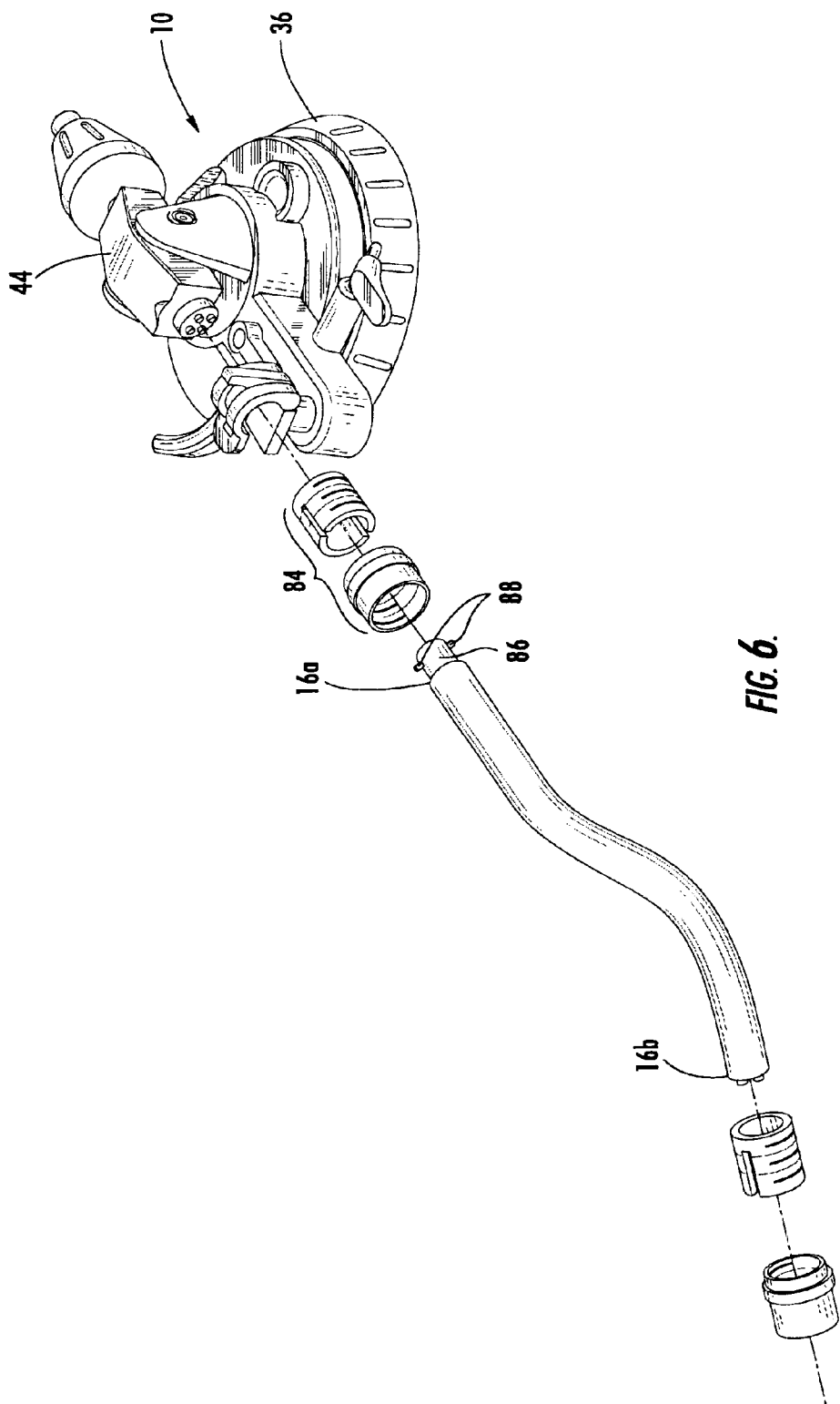
FIG. 6 is an exploded front perspective view of the tone arm assembly of FIG. 4.

Referring now to FIG. 6, the same tone arm assembly 10 of FIG. 5 is employed, in modular fashion, to accommodate an S-shaped tone arm tube 16. Essentially, the assembly of FIG. 6 is identical to the assembly of FIG. 5 except that an S-shaped tone arm tube 16 has been interchanged with the straight tone arm tube 14. This is possible due to the modularity of the tone arm assembly 10 of the present invention.

The S-shaped tone arm tube 16 is similar in construction to the straight tone arm tube 14 except that it has an S-shaped configuration. The S-shaped tone arm tube 16 also includes a first end 16a which connects to the tone arm housing 44 by a locking collar arrangement, generally referred to as 84 and a second end 16b which connects to a cartridge 26. The first end 16a of the S-shaped tone arm tube 16 includes a reduced neck portion 86 with an array of contacts (not seen in FIG. 6) and protrusion keys 88 to interconnect with the tone arm housing 44 in the same way as the first end 14a of the straight tone arm tube 14. Also, the second end 16b of the S-shaped tone arm tube 16 includes another array of electrical contacts for receiving the electrical contacts of the phonographic cartridge 26 shown in FIG. 7.

From the foregoing, the tone arm tube can be easily interchanged between different types of tone arm tubes, namely straight tone arm tubes 14 and an S-shaped tone arm tubes 16. The common type of interconnection facilitates the connection and disconnection of the tone arm tubes between a cartridge 26 and a tone arm housing 44. With the tone arm assembly 10 of the present invention, the overall type and performance of the turntable 12 can be quickly and easily converted from one type to another by interchanging the tube configuration. The unique and novel tone arm assembly of the present invention enables interchangeability of different types of tone arm tubes with the same tone arm assembly 10 on the same turntable.

It is preferred that the tone arm assembly 10, including the tone arm tubes 14, 16 be manufactured of metal material, such as die-cast aluminum but may be of other materials and still be within the scope of the present invention. Other components, such as the latch 54 and track 50, may be made of plastic or other materials.

It would be appreciated by those skilled in the art that various changes and modifications can be made to the illustrated embodiments without departing from the spirit of the present invention. All such modifications and changes are intended to be covered by the appended claims.

What is claimed is:

1. A tone arm assembly with an interchangeable tone arm tube, comprising:
    a fixed base having a longitudinal axis;
    a support bracket connected to the fixed base and rotatable about the longitudinal axis of the fixed base; the support bracket having a horizontal axis;
    a tone arm housing mounted in the support bracket and rotatable about the horizontal axis of the support bracket; the tone arm housing including a first connector;
    a straight tone arm tube having a first end and a second end; a second connector affixed to the first end of the straight tone arm tube;
    an S-shaped tone arm tube having a first end and a second end; a third connector affixed to the first end of the S-shaped tone arm tube;
    the second connector and the third connector being identical to one another and connectable with the first connector on the tone arm housing; and
    the straight tone arm tube and the S-shaped tone arm tube being interchangeably connected to the tone arm housing.

2. The tone arm assembly of claim 1, further comprising:
    a cartridge connected to the second end of the straight tone arm tube.

3. The tone arm assembly of claim 2, wherein the cartridge is removably connected to the second end of the straight tone arm tube.

4. The tone arm assembly of claim 1, further comprising:
    a cartridge connected to the second end of the S-shaped tone arm tube.

5. The tone arm assembly of claim 4, wherein the cartridge is removably connected to the second end of the S-shaped tone arm tube.

6. The tone arm assembly of claim 1, further comprising:
    a fourth connector affixed to the second end of the straight tone arm tube; the fourth connector being identical to the first connector on the tone arm housing.

7. The tone arm assembly of claim 1, further comprising:
    a fifth connector affixed to the second end of the S-shaped tone arm tube; the fifth connector being identical to the first connector on the tone arm housing.

8. A method of converting a tone arm assembly, comprising the steps of:
    providing a fixed base having a longitudinal axis;
    connecting a support bracket to the fixed base; the support base being rotatable about the longitudinal axis of the fixed base and having a horizontal axis;
    mounting a tone arm housing in the support bracket; the tone arm housing being rotatable about the horizontal axis of the support bracket;
    providing a first connector on the tone arm housing;
    providing a straight tone arm tube having a first end and a second end with a second connector affixed to the first end of the straight tone arm tube;
    attaching the straight tone arm tube to the tone arm housing with the first connector in engagement with the second connector;
    detaching the straight tone arm tube from the tone arm housing;
    providing an S-shaped tone arm tube having a first end and a second end with a third connector affixed to the first end of the S-shaped tone arm tube; the third connector being identical to the second connector; and
    attaching the S-shaped tone arm tube to the tone arm housing with the first connector in engagement with the third connector.

9. The method of claim 8, further comprising the step of:
    attaching a cartridge to the second end of the straight tone arm tube.

10. The method of claim 8, further comprising the step of:
    attaching a cartridge to the second end o the S-shaped tone arm tube.

11. A method of converting a tone arm assembly, comprising the steps of:
    providing a fixed base having a longitudinal axis;
    connecting a support bracket to the fixed base; the support base being rotatable about the longitudinal axis of the fixed base and having a horizontal axis;
    mounting a tone arm housing in the support bracket; the tone arm housing being rotatable about the horizontal axis of the support bracket;
    providing a first connector on the tone arm housing;

providing an S-shaped tone arm tube having a first end and a second end with a third connector affixed to the first end of the straight tone arm tube;

attaching the S-shaped tone arm tube to the tone arm housing with the first connector in engagement with the third connector;

detaching the S-shaped tone arm tube from the tone arm housing;

providing a straight tone arm tube having a first end and a second end with a second connector affixed to the first end of the straight tone arm tube; the second connector being identical to the third connector; and attaching the straight tone arm tube to the tone arm housing with the first connector in engagement with the second connector.

12. The method of claim 11, further comprising the step of:

attaching a cartridge to the second end of the straight tone arm tube.

13. The method of claim 11, further comprising the step of:

attaching a cartridge to the second end o the S-shaped tone arm tube.

* * * * *